(12) United States Patent
Cermelli et al.

(10) Patent No.: US 10,858,075 B2
(45) Date of Patent: *Dec. 8, 2020

(54) FLOATING ELECTRICAL CONNECTION SYSTEM FOR OFFSHORE ENERGY DEVICES

(71) Applicant: PRINCIPLE POWER, INC., Emeryville, CA (US)

(72) Inventors: Christian Cermelli, Bouc Bel Air (FR); Tiago Duarte, Carcavelos (PT); Cyril Godreau, Lisbon (PT)

(73) Assignee: PRINCIPLE POWER, INC., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,798

(22) Filed: Sep. 12, 2019

(65) Prior Publication Data

US 2020/0001946 A1   Jan. 2, 2020

Related U.S. Application Data

(63) Continuation of application No. 14/924,448, filed on Oct. 27, 2015, now Pat. No. 10,421,524.

(Continued)

(51) Int. Cl.
*B63B 22/04* (2006.01)
*B63B 1/10* (2006.01)
(Continued)

(52) U.S. Cl.
CPC .............. *B63B 22/04* (2013.01); *B63B 1/107* (2013.01); *B63B 22/18* (2013.01);
(Continued)

(58) Field of Classification Search
CPC .................... B63B 22/04; B63B 2035/446
See application file for complete search history.

(56) References Cited

U.S. PATENT DOCUMENTS 3,835,800 A   9/1974   Lloyd, III et al.
4,166,426 A   9/1979   Lloyd, III
(Continued)

FOREIGN PATENT DOCUMENTS

CA          996764      9/1976
DE      19620906 A1     3/1998
(Continued)

OTHER PUBLICATIONS

International Search Report and Written Opinion of the International Searching Authority for International Application No. PCT/US15/57636, dated May 6, 2016, 12 pages.

(Continued)

*Primary Examiner* — S. Joseph Morano
*Assistant Examiner* — Jovon E Hayes
(74) *Attorney, Agent, or Firm* — Dergosits & Noah LLP

(57) ABSTRACT

A floating connector of an offshore energy device and a method for connecting the floating connector is provided. The floating connector includes a buoy having a tube, a bay, a joint box, and at least one cable for connecting to the offshore energy device. The buoy provides buoyancy to the floating connector and includes the tube and bay. The bay houses the joint box, which electrically couples the at least one cable to each other and to a switchgear of the offshore energy device.

20 Claims, 13 Drawing Sheets

Related U.S. Application Data

(60) Provisional application No. 62/069,235, filed on Oct. 27, 2014.

(51) Int. Cl.
  *B63B 22/18* (2006.01)
  *F03D 13/25* (2016.01)
  *F03D 9/25* (2016.01)
  *B63B 35/44* (2006.01)
  *B63B 39/06* (2006.01)

(52) U.S. Cl.
  CPC . *B63B 2035/446* (2013.01); *B63B 2035/4433* (2013.01); *B63B 2039/067* (2013.01); *F03D 9/257* (2017.02); *F03D 13/25* (2016.05); *F05B 2240/93* (2013.01); *Y02E 10/725* (2013.01)

(56) References Cited

U.S. PATENT DOCUMENTS

| | | | |
|---|---|---|---|
| 4,167,147 A | 9/1979 | Bergman | |
| 4,538,939 A | 9/1985 | Johnson | |
| 4,648,848 A * | 3/1987 | Busch | E21B 17/015 441/5 |
| 4,781,023 A | 11/1988 | Gordon | |
| 6,558,215 B1 * | 5/2003 | Boatman | B63B 21/508 114/230.13 |
| 7,086,809 B2 | 8/2006 | Busso | |
| 7,156,037 B2 | 1/2007 | Borgen | |
| 7,242,107 B1 | 7/2007 | Dempster | |
| 7,281,881 B1 | 10/2007 | Cermelli et al. | |
| 7,531,910 B2 | 5/2009 | Flottemesch | |
| 8,053,916 B2 | 11/2011 | Edwards et al. | |
| 8,129,852 B2 | 3/2012 | Edwards et al. | |
| 8,471,396 B2 | 6/2013 | Roddier | |
| 8,729,723 B2 | 5/2014 | Boureau et al. | |
| 9,394,935 B2 | 7/2016 | Dagher | |
| 2003/0159638 A1 | 8/2003 | Lay | |
| 2004/0141812 A1 | 7/2004 | Busso | |
| 2005/0278982 A1 * | 12/2005 | Herzog | E01B 27/02 37/104 |
| 2006/0165493 A1 | 7/2006 | Nim | |
| 2007/0240624 A1 | 10/2007 | Collee et al. | |
| 2008/0014025 A1 | 1/2008 | They | |
| 2008/0038067 A1 | 2/2008 | Sharapov | |
| 2010/0140944 A1 | 6/2010 | Gardiner et al. | |
| 2011/0074155 A1 * | 3/2011 | Scholte-Wassink | B63B 35/44 290/44 |
| 2011/0140426 A1 | 6/2011 | Garcia Lopez et al. | |
| 2011/0148115 A1 * | 6/2011 | Roznitsky | F03D 13/40 290/44 |
| 2011/0200425 A1 * | 8/2011 | Weaver | B63B 35/44 415/7 |
| 2012/0073487 A1 * | 3/2012 | Pantaleon Prieto | F03D 13/25 114/264 |
| 2012/0269628 A1 | 10/2012 | Liu | |
| 2012/0294681 A1 | 11/2012 | Wong | |
| 2013/0099496 A1 | 4/2013 | Soheim | |
| 2013/0276691 A1 | 10/2013 | Thieffry | |
| 2014/0193259 A1 | 7/2014 | Borgen | |
| 2014/0246232 A1 * | 9/2014 | Wyatt | H01R 43/26 174/75 D |
| 2015/0147174 A1 | 5/2015 | Couchman et al. | |
| 2015/0275850 A1 * | 10/2015 | Numajiri | F03D 13/25 290/55 |
| 2016/0114863 A1 * | 4/2016 | Cermelli | B63B 22/04 441/133 |

FOREIGN PATENT DOCUMENTS

| | | |
|---|---|---|
| DE | 19802574 A1 | 3/1999 |
| DE | 20001864 U1 | 4/2000 |
| DE | 19955586 A1 | 6/2001 |
| DE | 20020232 U1 | 1/2002 |
| DE | 202014004373 U1 | 6/2014 |
| EP | 1363019 | 11/2003 |
| EP | 2143629 | 1/2010 |
| EP | 2074018 B1 | 5/2010 |
| GB | 1065216 A | 4/1967 |
| JP | 1988039500 | 2/1988 |
| JP | 1991235789 | 10/1991 |
| JP | 1992197887 | 7/1992 |
| JP | 1994158571 | 6/1994 |
| JP | 10511753 A | 11/1998 |
| JP | 2000203487 | 7/2000 |
| JP | 2001180584 | 7/2001 |
| JP | 2003343447 | 12/2003 |
| JP | 2008013101 | 1/2004 |
| JP | 2004175137 | 6/2004 |
| JP | 2004176626 | 6/2004 |
| JP | 2004218436 | 8/2004 |
| JP | 2004251139 | 9/2004 |
| JP | 2004526609 | 9/2004 |
| JP | 2005504205 | 2/2005 |
| JP | 2005069025 | 3/2005 |
| JP | 2005271673 | 10/2005 |
| JP | 2006274816 | 10/2006 |
| JP | 2007002721 | 1/2007 |
| JP | 2007505784 A | 3/2007 |
| JP | 2007263077 | 10/2007 |
| JP | 2008095512 | 4/2008 |
| JP | 2010064649 | 3/2010 |
| JP | 2010115978 | 5/2010 |
| JP | 2010234980 | 10/2010 |
| JP | 2009213487 | 12/2011 |
| JP | 2012045981 | 3/2012 |
| JP | 2012107584 | 6/2012 |
| JP | 2002188557 | 7/2012 |
| JP | 2014504697 A | 2/2014 |
| JP | 2014061848 | 4/2014 |
| JP | 2014111924 | 6/2014 |
| JP | 2014218186 | 11/2014 |
| JP | 2014218958 | 11/2014 |
| JP | 2015006884 | 1/2015 |
| JP | 2014112115 A1 | 1/2017 |
| WO | 198505174 | 11/1985 |
| WO | 200134977 | 5/2001 |
| WO | 2002028702 | 4/2002 |
| WO | 2002073032 A1 | 9/2002 |
| WO | 2002088475 | 11/2002 |
| WO | 2007071647 | 6/2007 |
| WO | 2011147482 | 12/2011 |
| WO | 2012059381 | 5/2012 |
| WO | 2011138824 | 7/2013 |
| WO | 2013156759 | 10/2013 |
| WO | 2015063215 A1 | 5/2015 |
| WO | 2005075822 | 8/2015 |
| WO | 2016069636 A3 | 5/2016 |

OTHER PUBLICATIONS

International Search Report and Written Opinion of the International Searching Authority for International Application No. PCT/US14/38853, dated Dec. 12, 2014 12 pages.
International Preliminary Report on Patentability for International Application No. PCT/US09/39692, dated Jul. 15, 2010, 7 pages.
International Search Report and Written Opinion of the International Searching Authority for International Application No. PCT/US16/38235, dated Nov. 2, 2016, 11 pages.
EP Search Report for Application No. 19185018.9, dated Sep. 19, 2019, 7 pages.
EP Search Report for Application 15856048.2, dated Apr. 19, 2018,.
Chinese First Office Action-Search Report for Application No. 2015800579977, dated Jul. 12, 2018.
European Search Report for Appln. No. 14152768.9 dated Mar. 27, 2014.

(56) References Cited

OTHER PUBLICATIONS

"A Study on Antiwave Performance of Box Girder Type Floating Wind Farm", by Ohta et al., 17th Marine Engineering Symposium, The Society of Naval Architects of Japan, Jul. 2003, pp. 115-118.

\* cited by examiner

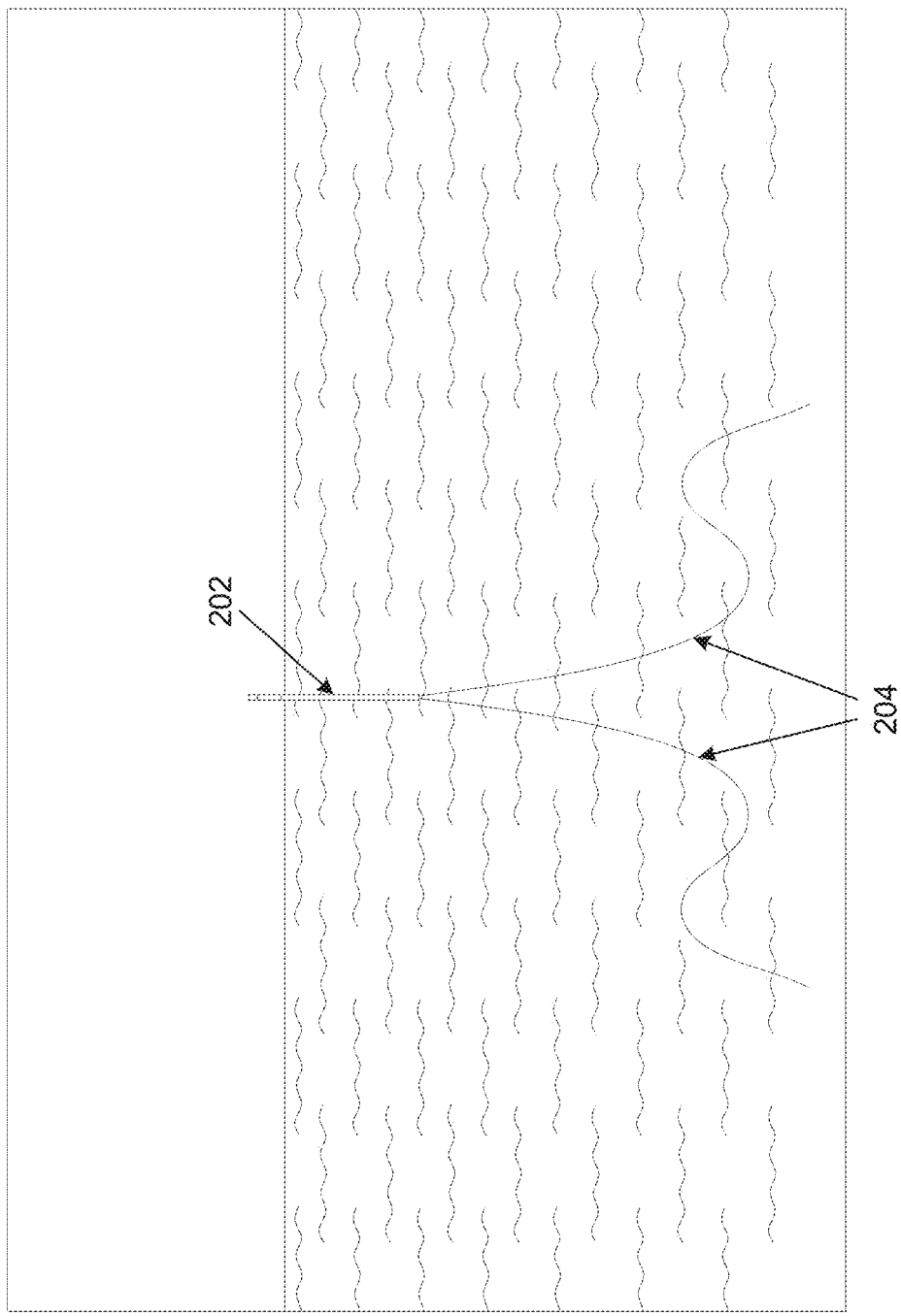

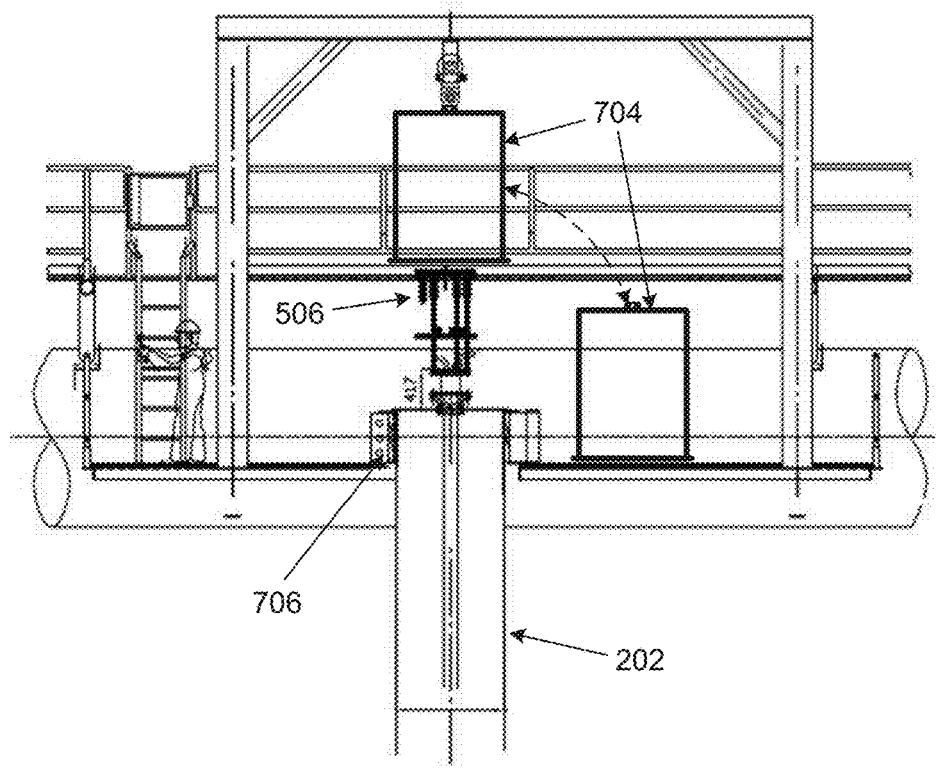
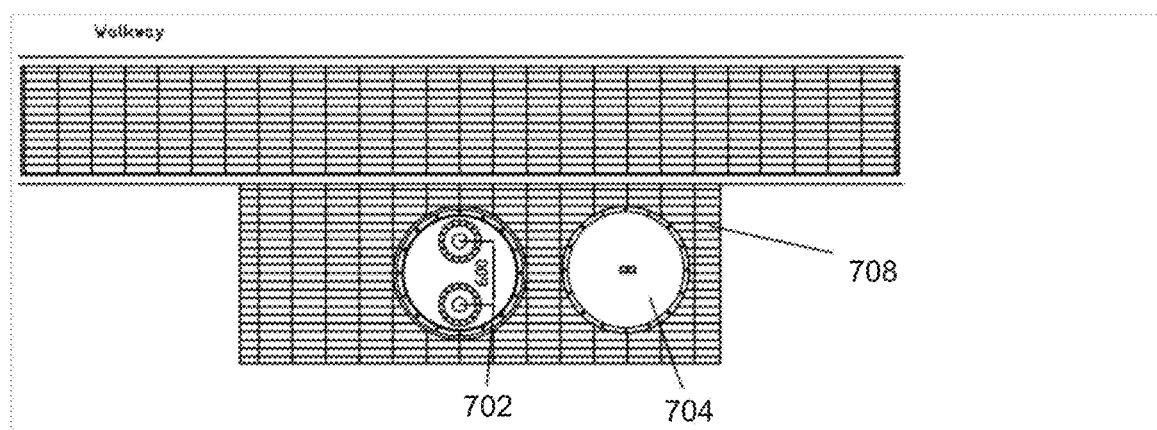
Fig. 7

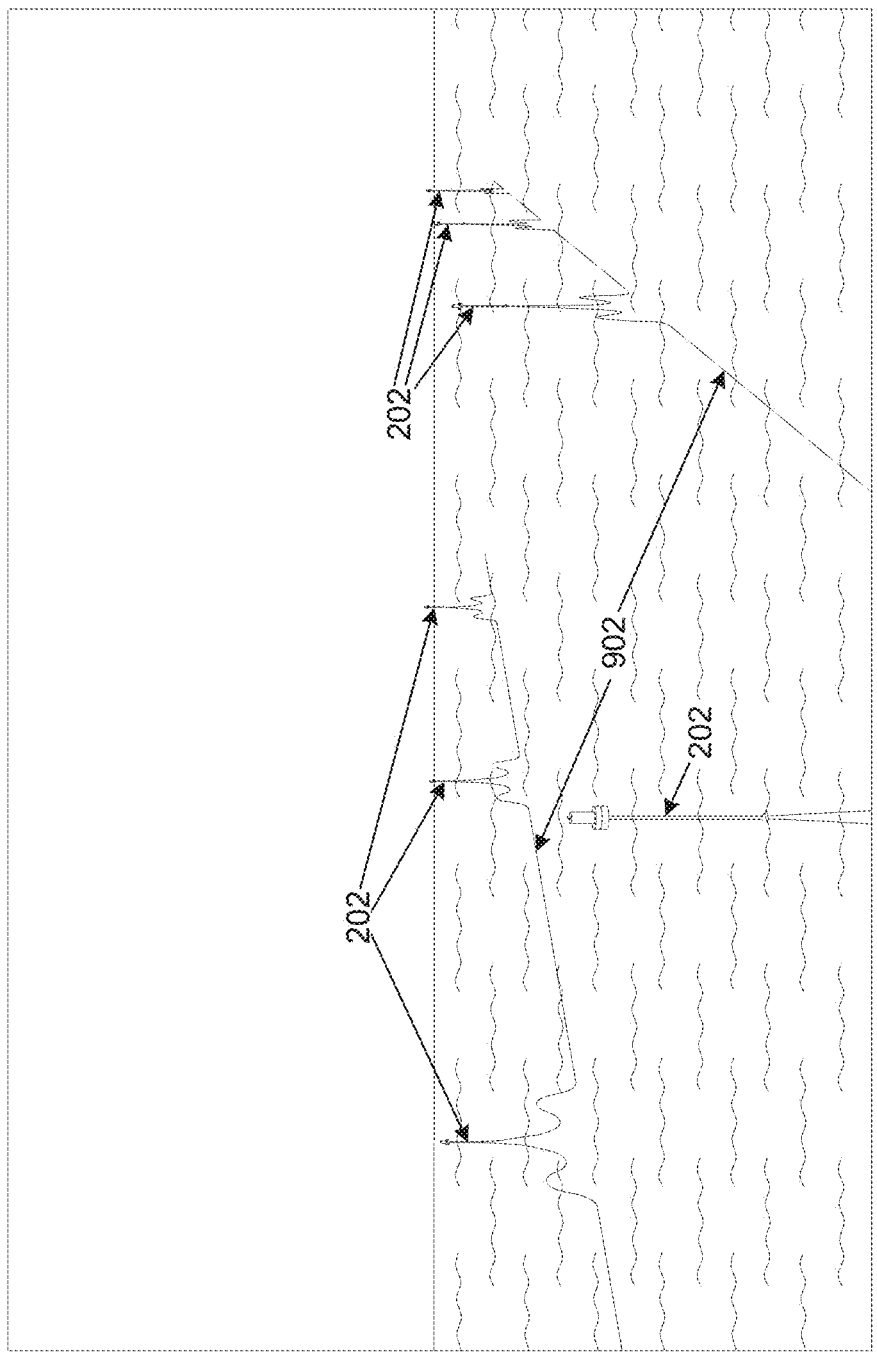

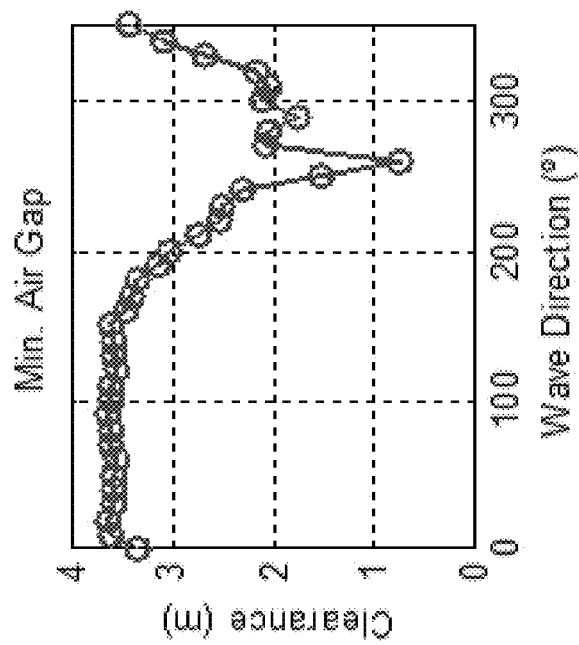
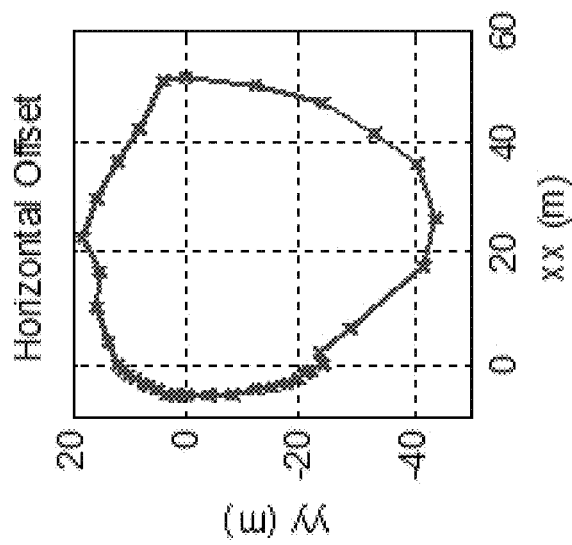
Fig. 12

FLOATING ELECTRICAL CONNECTION SYSTEM FOR OFFSHORE ENERGY DEVICES

CROSS-REFERENCE TO RELATED APPLICATIONS

The present application is a continuation of U.S. patent application Ser. No. 14/924,448, entitled "Connection System For Array Cables Of Disconnectable Offshore Energy Devices," filed on Oct. 27, 2015, which claims the benefit of U.S. Provisional Patent Application 62/069,235, entitled, "Connection System for Array Cables of Disconnectable Offshore Energy Devices", filed on Oct. 27, 2014, the contents of each are hereby incorporated by reference.

BACKGROUND OF THE INVENTION

The present invention relates to offshore energy converter units. In particular, the technology disclosed herein provides for a novel way to connect array cables to individual offshore energy converter units of an offshore energy farm.

BRIEF SUMMARY OF THE INVENTION

The invention relates to the connection of array cables (for electric power connection and communications), between individual offshore energy converter (OEC) units of an offshore energy farm. In particular, the invention enables the quick disconnection and reconnection of each individual OEC unit, while keeping the flow of energy and information between adjacent OEC units.

The disclosed subject matter relates to a floating connector of an offshore energy device. The floating connector includes a buoy having a long spar like floater, where the buoy provides buoyancy to the floating connector. The floating connector further includes at least two submarine cables for connecting to the offshore energy device. The floating connector also includes a joint box for coupling to the offshore energy device and for providing an electrical connection of the submarine cables to a switchgear of the offshore energy device. When the joint box is coupled to the offshore energy device, an electrical circuit with the at least two cables is completed through the offshore energy device via the switchgear.

The disclosed subject matter also relates to a method for installing a floating connector system of an offshore energy converter device. Two cable ends of a pre-laid section of an array of cables are picked up from a seabed. The two cable ends are then connected inside the floating connector system. The connector system includes a buoy having a long spar like floater that provides buoyancy to the floating connector system. The connector system further includes at least two cables for connecting the offshore energy device to additional offshore energy converter devices. The connector system also includes a joint box for coupling to the offshore energy device and for providing an electrical connection of the at least two submarine cables to a switchgear of the offshore energy device. When the joint box is coupled to the offshore energy device, an electrical circuit with the at least two submarine cables is completed through the offshore energy device via the switchgear.

The disclosed subject matter further relates to a floating connector of an offshore energy device that includes a buoy having a long spar like floater. The buoy provides buoyancy to the floating connector system. The floating connector further includes a single cable for connecting the offshore energy device to additional offshore energy converter devices. The floating connector also includes a joint box for coupling to the offshore energy device and for providing an electrical connection of the at least two cables to a switchgear of the offshore energy device. When the joint box is coupled to the offshore energy device, an electrical circuit with the at least two cables is completed through the offshore energy device via the switchgear. The single cable is used to connect a last offshore energy converter device to a string of offshore energy converter devices.

BRIEF DESCRIPTION OF THE FIGURES

FIG. 2 depicts a floating I-Tube with electric cables acting as a station keeping system.

FIG. 7 depicts a floating I-Tube joint box and electrical connections with the cover in an open position.

FIG. 9 provides an illustration of pre-laid array cables for an offshore energy farm.

FIG. 12 shows test results of the floating I-Tube in its floating condition.

DETAILED DESCRIPTION

Figure 1A:
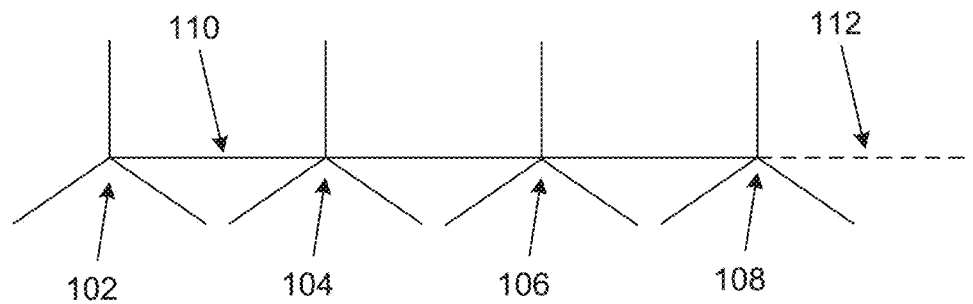
FIGS. 1a-1c depict an offshore energy farm layout.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

The system employs a buoy, herein designated as a "floating I-Tube", consisting of a long spar like floater, which acts as an I-Tube to protect two array cables. In normal production, the floating I-Tube is attached to the renewable energy device, and two or more array cables are connected to the onboard switchgear, using disconnectable connectors. The concept allows the OEC unit to be removed from location (e.g., for operations and maintenance requirements) without losing the connection to other OEC units connected in series, thereby minimizing the production loss in the farm. Without the energy device present, the floating I-Tube may float in a location with two or more connected array cables and act as the station-keeping system. The invention also significantly reduces the connection and disconnection time, thereby allowing the OEC to be easily disconnected and towed to shore for maintenance operations. Having maintenance performed at shore helps avoid the need for specialized vessel used to perform offshore work. The invention also provides easy access to the electric cable ends at the deck level of the OEC.

Different methods to connect array cables in OEC farms exist. A method to install offshore submarine electric cables using dry-mateable connectors is described in WO2013050755, titled "Offshore Electrical Plant Installation Method and System." However, in that cited invention, the connectors need to be lowered to the seabed after connection, and pulled back up if disconnection is required.

A disconnectable offshore wind energy generator is described in U.S. Pat. No. 8,729,723 B2, "Removable Offshore Wind Turbines with Pre-Installed Mooring System," which consists of a floating platform with two or more wind turbines, where the floating platform is connected to a second floater to which the mooring lines and array cable are connected. The platform supporting the wind generators is free to rotate around the mooring platform, according to the wind direction, much like the turrets used in floating production storage and offloading (FPSO) units used in the oil and gas industry.

The Pelamis concept described in EP 2110307 B1, "Mooring System," also presents a disconnectable submerged buoy for easy connection and disconnection of the OEC. This invention, however, requires wet-mate connectors, which may not adaptable to the high tension of the power cables of multi-megawatt OECs.

Several offshore energy converters OEC have been developed in recent years, to exploit the natural and renewable energy sources located offshore (wind, waves, current and others). Depending on the site depth, many of these devices employ floating supporting structures, like the WindFloat described in U.S. Pat. No. 8,471,396 B2, "Column-stabilized offshore platform with water-entrapment plates and asymmetric mooring system for support of offshore wind turbines," or the Pelamis concept cited above. One advantage of these floating OECs is the capability of being towed to shore for maintenance operations, thus avoiding the use of costly offshore cranes or construction vessels. However, by doing so, all the mooring lines and array cables connected to the OEC must be disconnected. Moreover, most of the offshore energy farms rely on array cables, connecting several units in series.

Figure 1B:
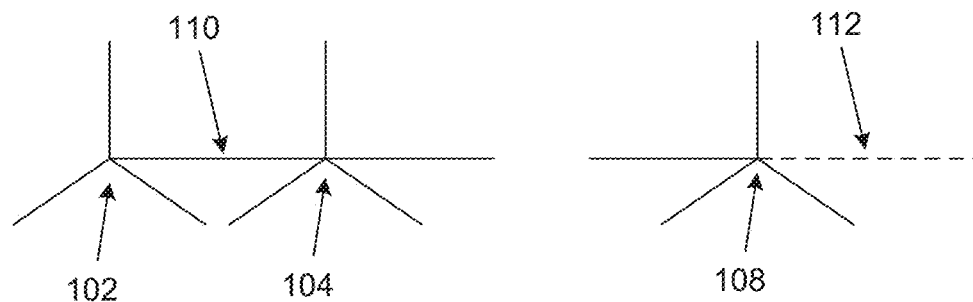
Figure 1C:
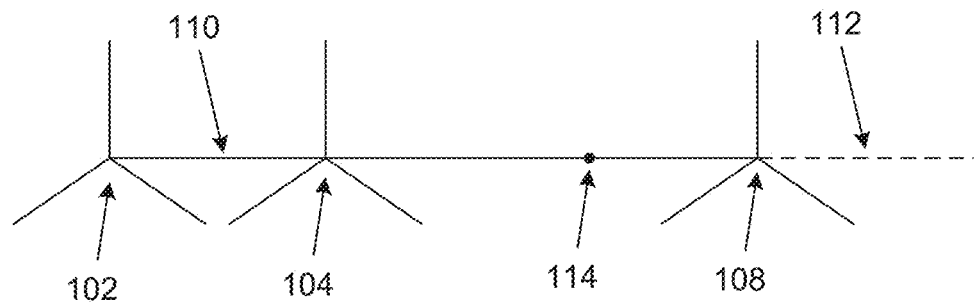

FIGS. 1a-1c depict an offshore energy farm layout, including station keeping system 100, array electric cable 110, shore cable 112, and OEC devices 102-108. In the case of an offshore farm with multiple OEC devices 102-108 (see FIG. 1a), removing OEC device 106 would mean the loss of connection with the OEC devices 102-104, which connected after the one which has been disconnected (i.e., OEC device 106), as shown in FIG. 1b. The present invention would allow an OEC device to be removed while keeping the power flowing within the offshore renewable farm, as shown in FIG. 1c, by using a floating buoy 114 to connect both array cables.

As shown in FIG. 2, the invention employs a floating I-Tube 202, capable of supporting two or more electric cables 204 connected to each renewable energy device. When the energy device needs to be removed due to an operations and maintenance operation, the floater may simply be disconnected from the platform and lowered to the sea level. The electric cables may act as the station keeping system for this floater, when the OEC is disconnected and towed onshore to be repaired. Once the OEC has been repaired, towed back out to sea and reconnected to the mooring system, the I-Tube may be pulled back to the platform and rigidly connected to it to act as a permanent I-Tube. This system ensures that even if the platform is removed, the power is still flowing to the adjacent turbines.

In some embodiments, the invention can also be applied to the last renewable energy device in a string of devices. In this case, a single cable may run through the I-Tube, and connect the device to the grid. In case the last unit needs to be disconnected, the I-Tube is left in place, thus leaving the electric cable floating at the surface level.

Connection and Disconnection Method

Figure 3:
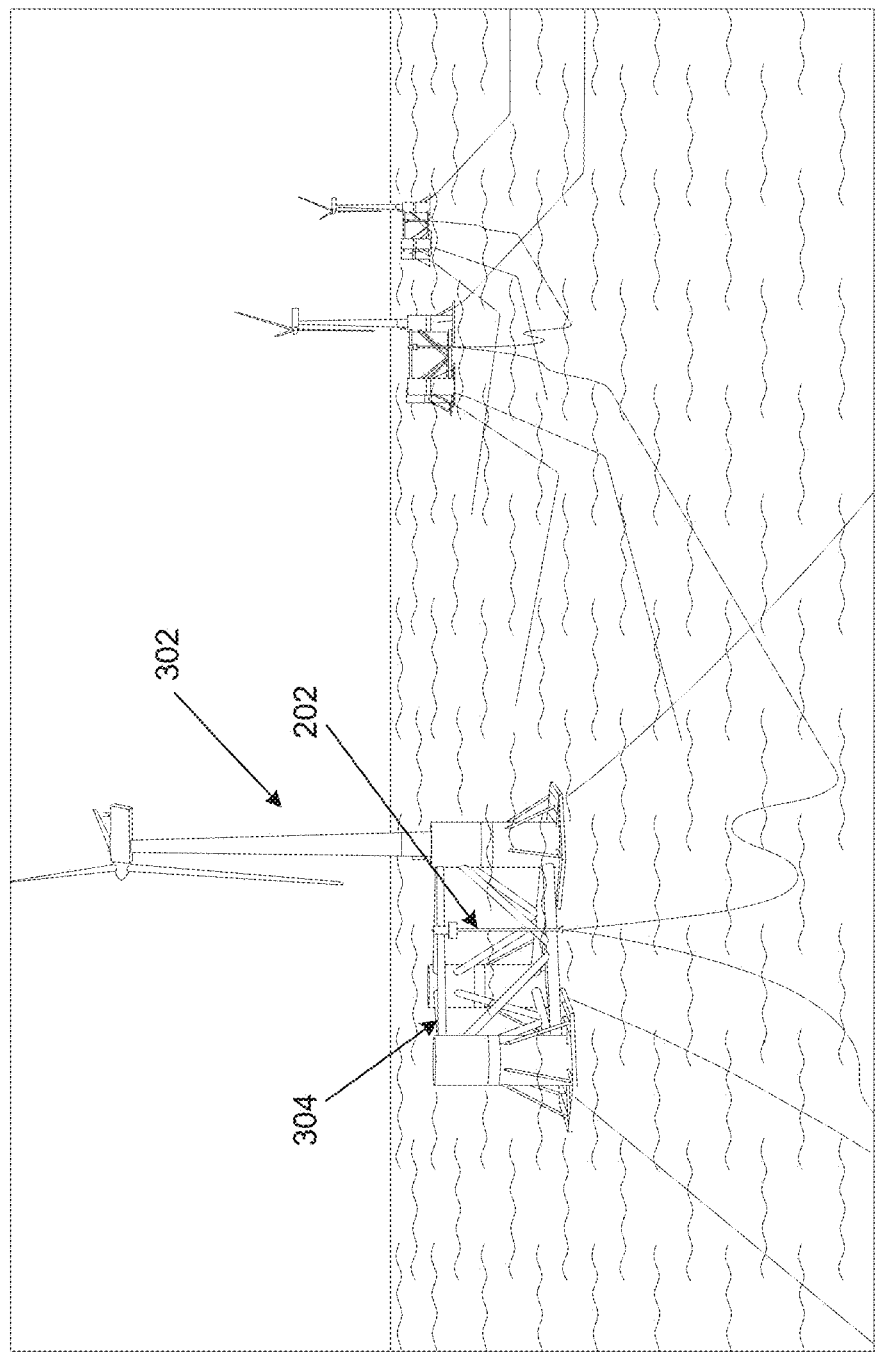
FIG. 3 shows an offshore energy farm with multiple offshore energy converter devices using the floating I-Tube.
Figure 4A:
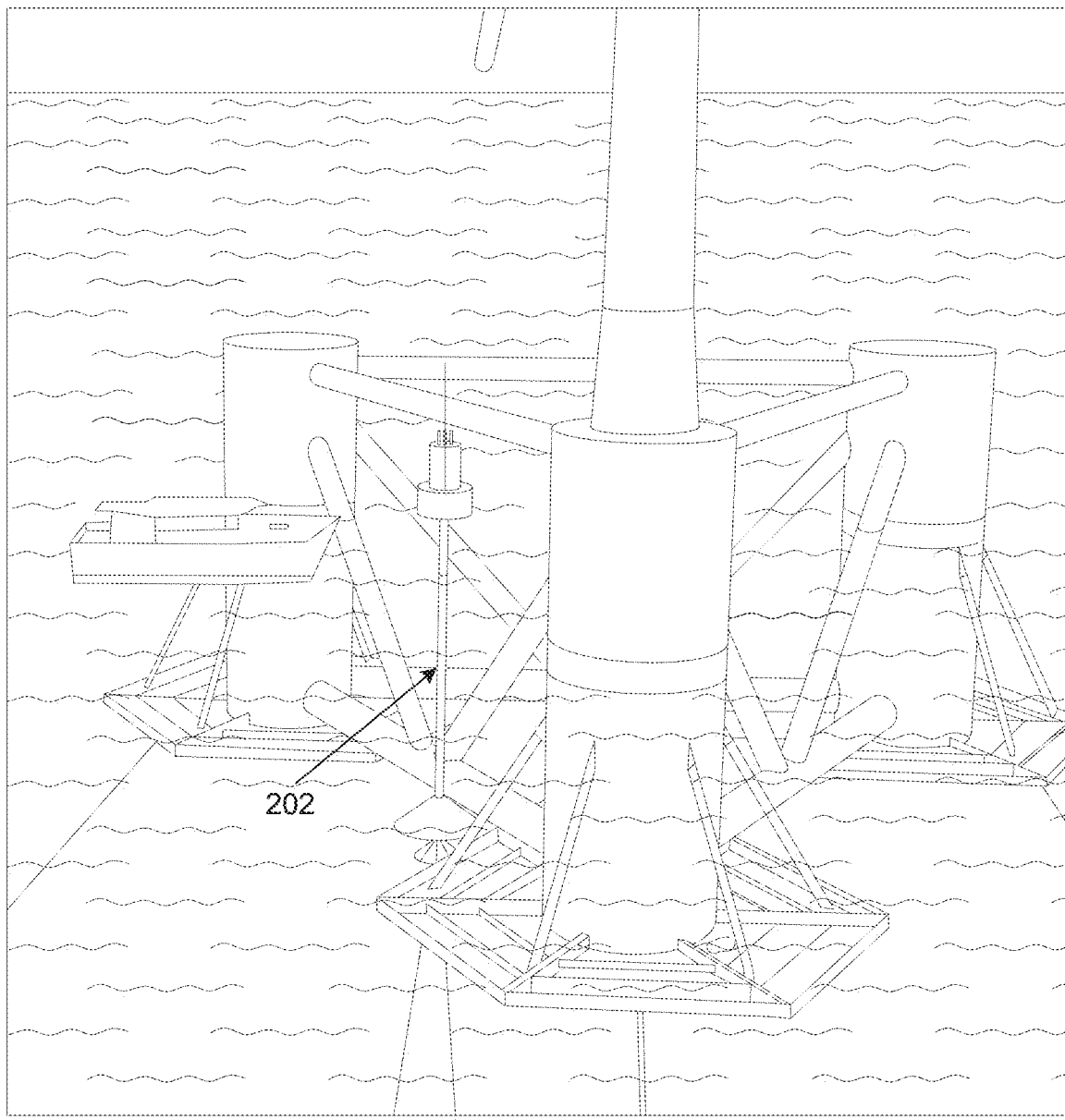
FIGS. 4a-4b illustrate a disconnection of the offshore energy converter.
Figure 4B:
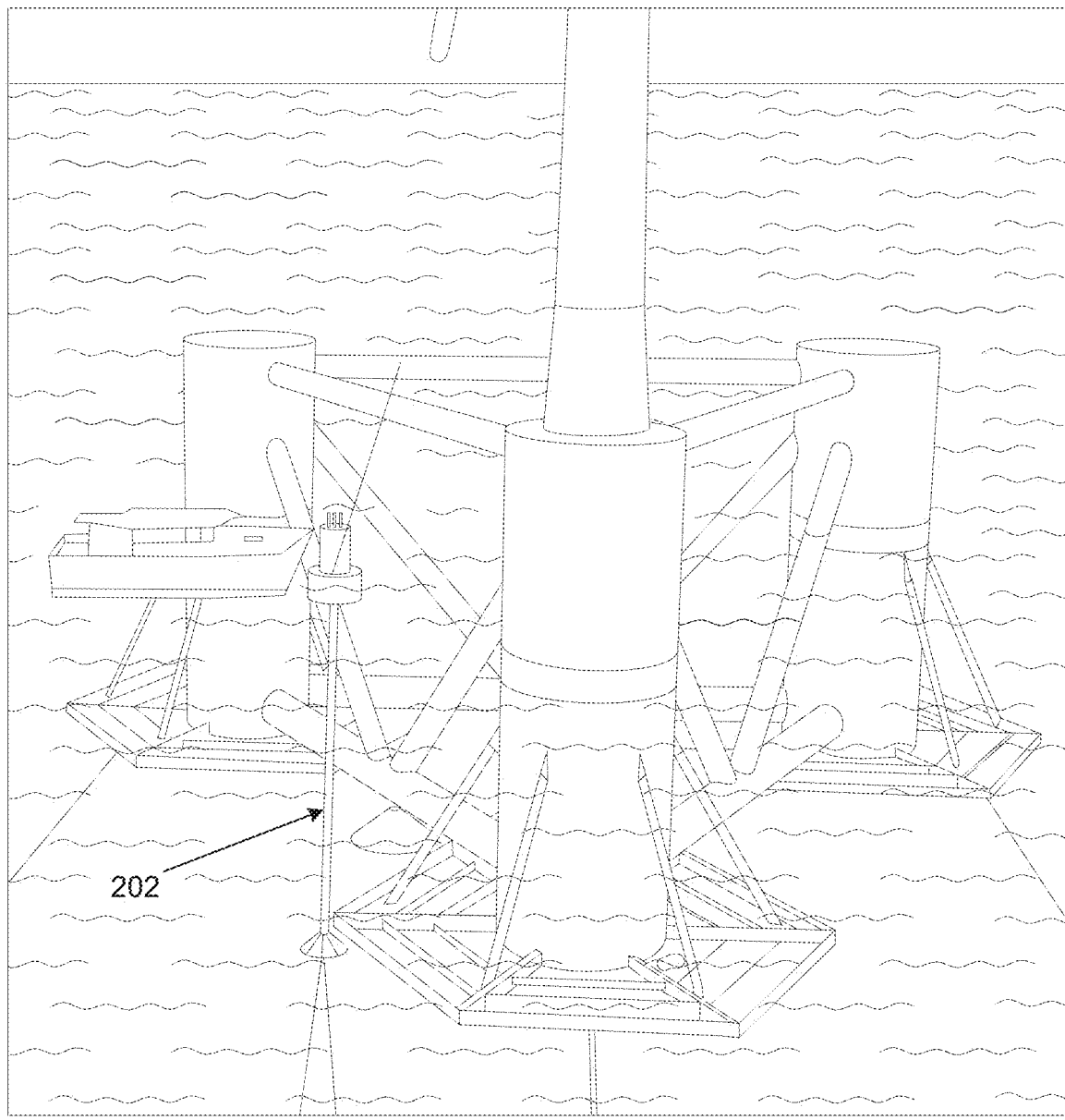

As shown in FIG. 3, the floating I-Tube 202 is rigidly attached to the OEC 302 during normal operation. In order to disconnect the I-Tube 202 from the platform 304, the floating I-Tube 202 would be lowered to its floating draft, as shown in FIGS. 4a-4b, and then pulled away from the OEC with a small support vessel. This would only be necessary while the OEC station keeping system is being disconnected. The floater is designed to support two or more electric cables while the OEC is onshore for operations and maintenance activities. Prior to deployment, an enclosed bay of the floating I-Tube could be pressurized to guarantee the required buoyancy.

After the major operations and maintenance operation, the platform can be brought to location and hooked-up to its mooring system. The disconnection process is then reversed, and the I-Tube floater can be pushed back to the platform with a small vessel. Fenders located at the bottom of the OEC would guide the buoy into place, restraining the motion of the floating I-Tube. A winch onboard the OEC may be used to pull-up the floater, which would require a tension below 15 tons for shallow water locations. The tension requirements, however, may vary depending on the water depth.

Electric Cable Connection

Figure 5B:
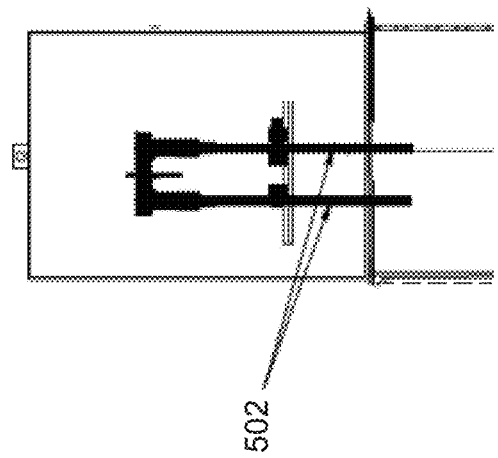
FIG. 5b shows an electric power cable platform connection in a disconnected I-Tube state.
Figure 5A:
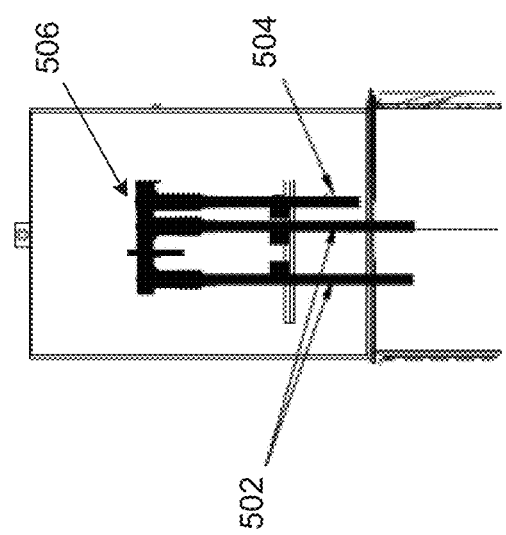
FIG. 5a shows an electric power cable platform connection in production state.

To allow for a quick connection and reconnection of the electric conductor of the array cable in case of a large operation and maintenance operation, typical separable High Voltage T-Connectors (e.g., as described in Nexans or NKT Catalogues) may be used. To connect the array cables with the OEC unit, a joint box may be employed. At least one joint box will be located on the floating I-Tube. During normal production, the two or more submarine cables 502 are connected to the pre-wired OEC cable 504 connected to the OEC switch gear on the joint box 506 at the top of the I-Tube, as show in FIG. 5a. The joint box 506 would allow for the quick disconnection and reconnection of the conductors by using industry standard separable electrical connectors. When the OEC is producing energy, the two submarine cables 502 running through the I-Tube are connected to the cable 504 coming from the switchgear onboard the OEC unit. If the OEC needs to be taken out, the cable 504 coming from the OEC switchgear is disconnected from the joint box 506 onboard the floating I-Tube. In this condition the power can flow between the two adjacent OECs, and the I-Tube is ready to be deployed, as shown in FIG. 5b.

Floating I-Tube Components

Figure 6:
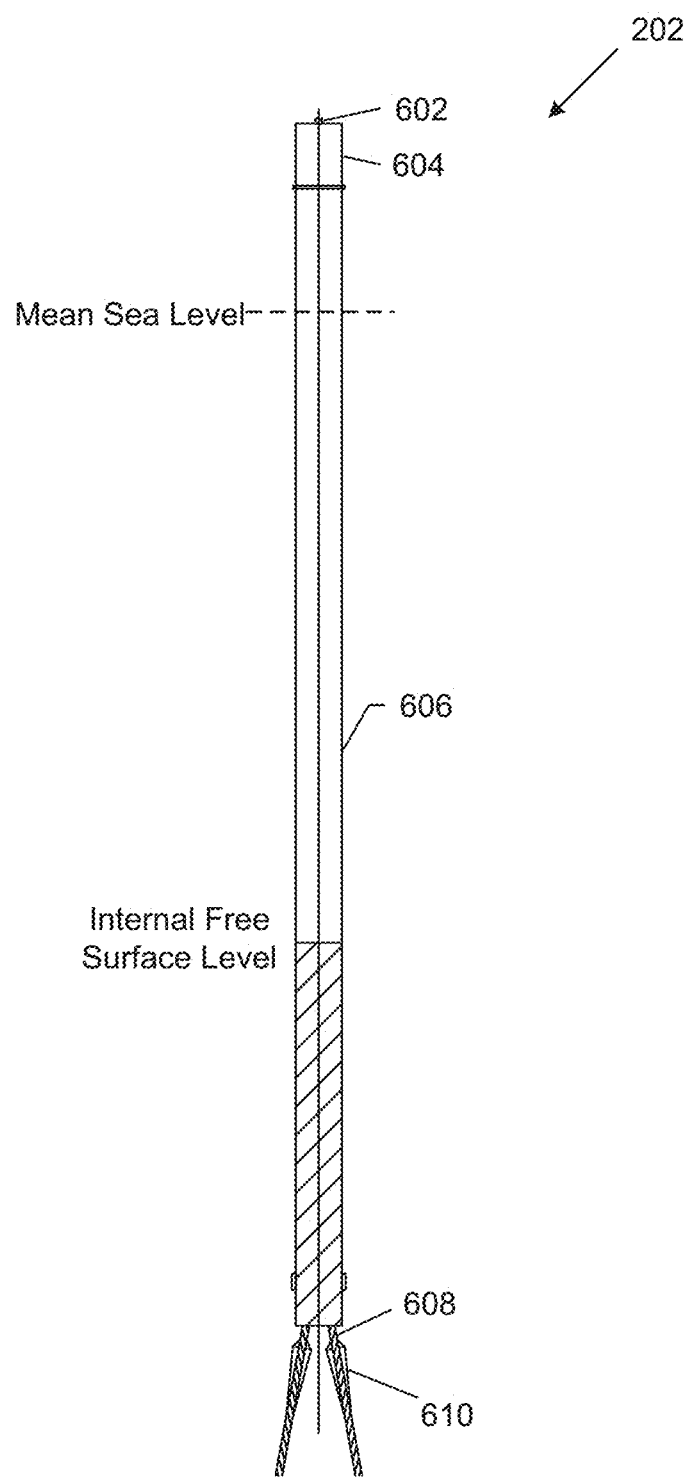
FIG. 6 provides a representation of the components of a floating I-Tube.

FIG. 6 presents the components of the floating I-Tube 202 of this invention. The floating I-Tube 202 includes lifting pad eye 602 enclosed bay 604, I-Tube 606, and bell-mouths 608. The lifting pad eye 602 provides a means for handling the I-Tube 202 during connection and disconnection to the OEC (e.g., lifting the I-Tube to the OEC). It also facilitates the removal of the cover of the enclosed bay 604 for maintenance access to the electric connectors. This enclosed bay 604 provides the required protection to the cable electric connectors during normal production and floating case.

Depending on the type of the OEC unit and the water depth, the relative dimensions of the floating I-Tube may vary. As seen in FIG. 7, which depicts the floating I-Tube joint boxes and electrical connections, the size of the connectors as well as the minimum bending radius of the connectors will drive the overall size of the arrangement.

I-Tube 606 in FIG. 6 protects the electric cables from the hang-offs at the exit of the bell-mouth 608. The I-Tube 606 and the enclosed bay 604 can be manufactured out of standard steel pipes, using air sealed flanges to guarantee the air-tightness of the floating I-Tube. Typical dimensions may vary between 0.6 to 1.5 m in diameter, with a length dependent on the design of the OEC. The enclosed bay 604 and I-Tube 606 can be pressurized to drop the water level below the mean floatation level of the floating I-Tube. The remaining water level inside the I-Tube will contribute to stabilize the I-Tube in Floatation mode. The bell mouth tubes provide the connection point for the bending stiffeners 610 at the cable exiting points.

The cable coming from the turbine will be connected to the joint box 506 on the floating I-Tube. FIG. 7 shows the floating I-Tube 202, joint box 506 and electrical connectors 702 when connected to the OEC. As further shown in FIG. 7, the cover 704 of the enclosed bay can be lifted to provide access the electric connectors 702, thereby allowing for operations and maintenance operations. The cover 704 of the enclosed bay can be stored on the deck 708 during the duration of the operations. After completion of the works, the enclosed bay is covered again to protect the electric connections. The A-Frame 706 on the top of the I-Tube is used to connect it to the platform, open the enclosed bay and pull the electric cables through the I-tube during installation.

Figure 8A:
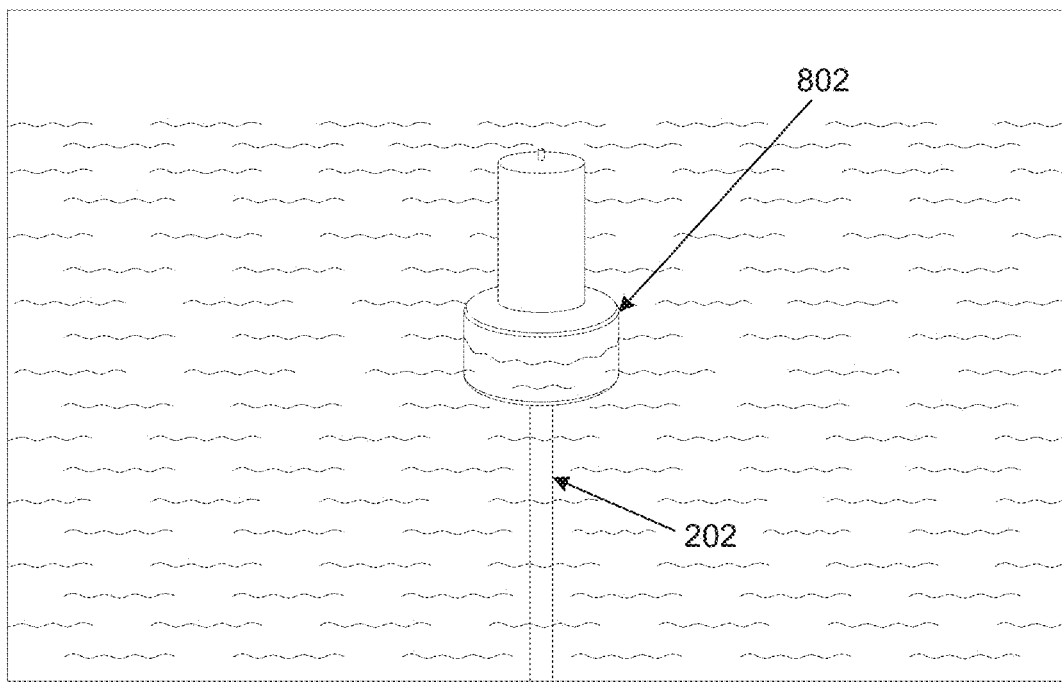
FIGS. 8a-8b provide representations of alternative floating I-Tube configurations for different locations and environmental conditions.
Figure 8B:
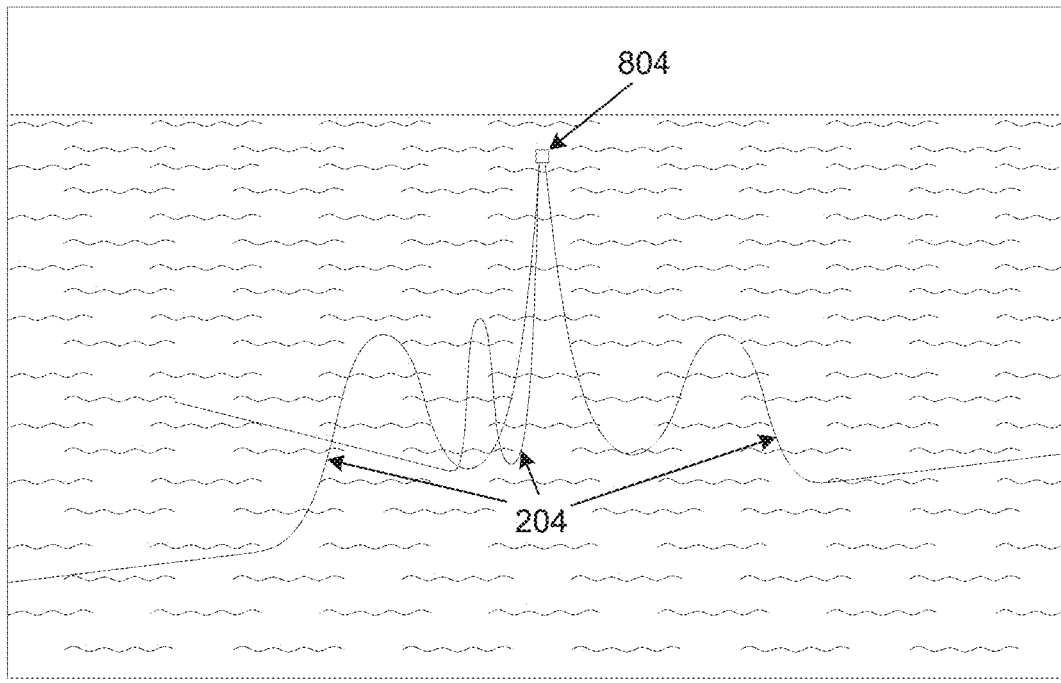

In some embodiments, sufficient buoyancy may not be provided by I-Tube 202, and thus an additional floater section 802 may be necessary, as shown in FIG. 8a. For some locations, with high current velocities or large water depths, a submerged design could be employed, like seen in FIG. 8b. In this case, the electric cables 204 are connected directly to the platform level. When the I-Tube 202 is deployed, the buoy 804 may be fully submerged and float at an intermediate equilibrium position in the water column.

Installation Method

The invention enables two possible installation methods, according to which the array cables can be pre-laid before the OEC units are installed, or post-laid, after the OEC's are connected to their station keeping system.

Array Cable Pre-Laying

As the floating I-Tube buoy has the ability to maintain location using the array cables as it station keeping system, it can be deployed before the OEC unit is installed in location. The array cable network would then be installed before the actual OEC units are transported to location. FIG. 9 shows pre-laid array cables 902 for offshore energy farms.

Figure 10:
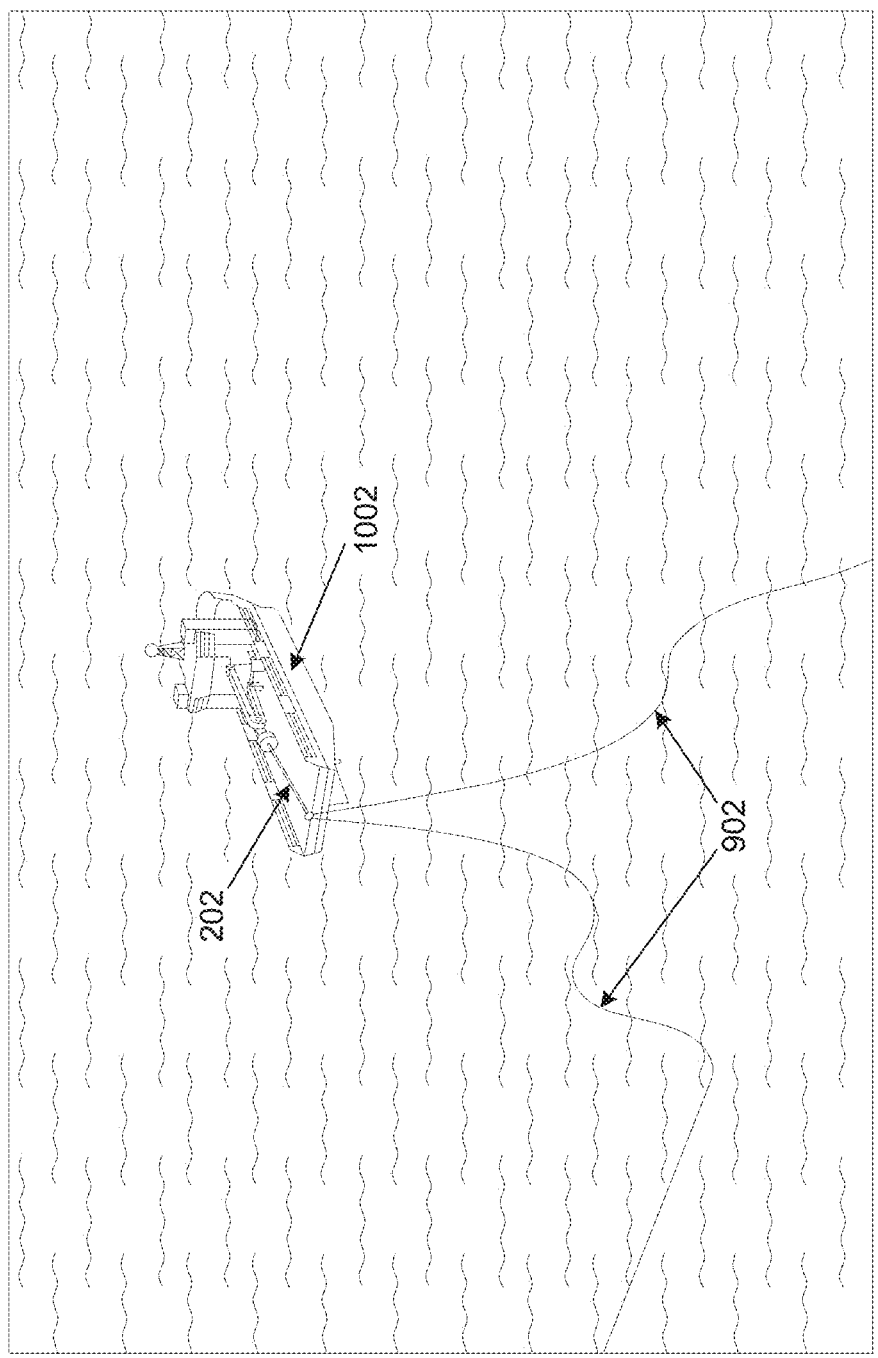
FIG. 10 shows the deployment of a floating I-Tube from an offshore anchor handling vessel.

This installation method would start by pre-laying all the sections of the array cable on the seabed. Two cable ends would be deployed close to the location of each OEC. Using an anchor handling vessel to carry the floating I-Tube 202, the two cable ends would be picked up from the seabed and connected inside the floating I-Tube 202. FIG. 10 shows the deployment of the floating I-Tube 202 from an offshore anchor handling vessel 1002 during pre-laying operations of the array cables 902 of an offshore energy farm. The anchor handling vessel would then deploy the floating I-Tube 202 on the location of the first OEC of the offshore energy farm, and then move to the next OEC location to repeat the process and install a new floating I-Tube.

The OEC unit could then be transported to location. Once secured to its station keeping system, the floating I-Tube would be coupled to the OEC unit by the means described above.

Array Cable Post-Laying

Figure 11:
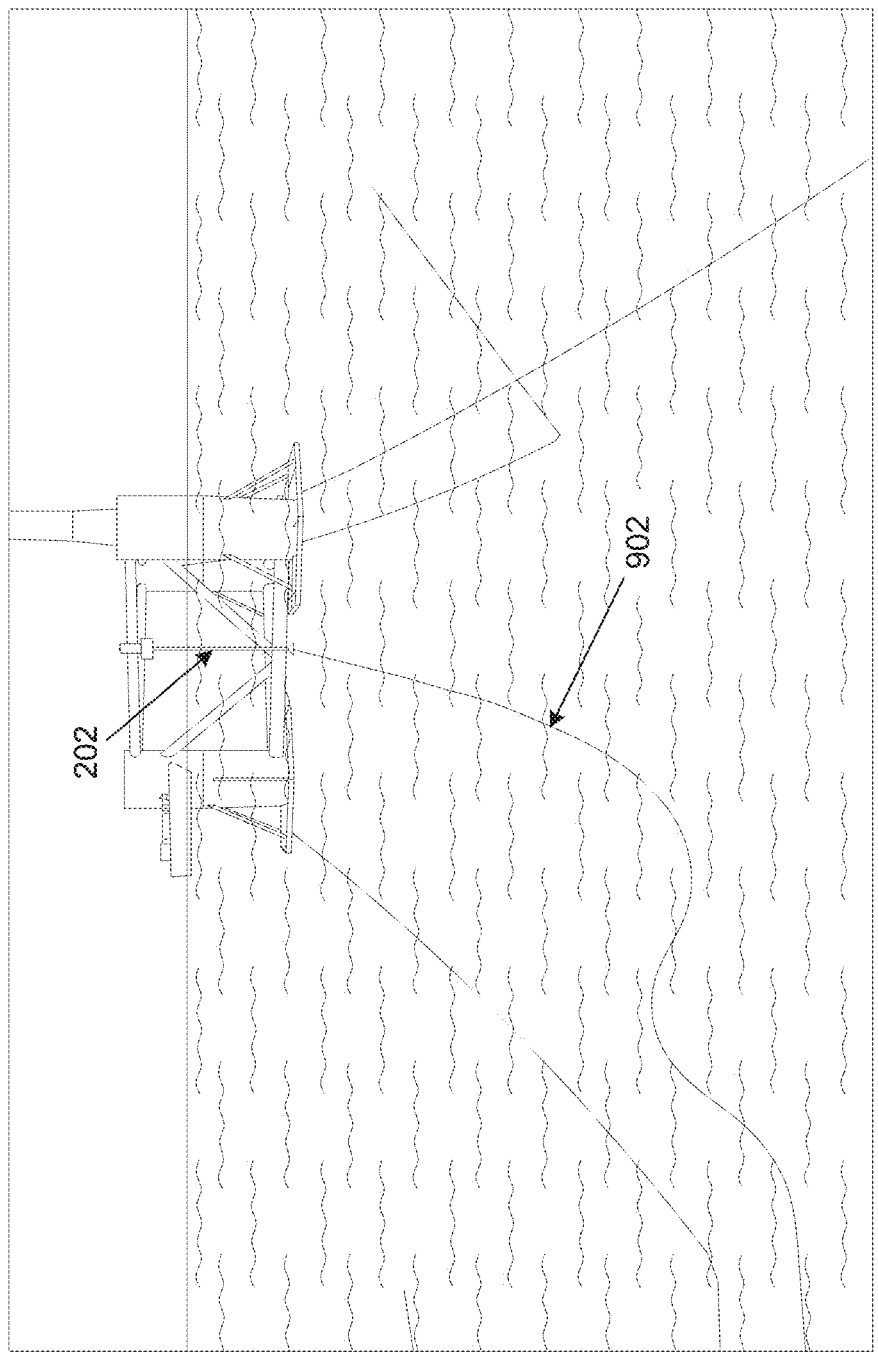
FIG. 11 depicts the installation of the array cables using a pulling head and guide-wire.

The array cables may also been post-laid, for example, after the OEC's are installed in their locations and connected to their station keeping systems. In this case, the floating I-Tubes 202 could be already connected to the OEC during its final assembly stage onshore. The array cables 902 could then be installed like in the case of a fixed I-Tube, using a pulling head and a guide-wire to pull the electric cable from the OEC, as shown in FIG. 11.

Survivability of the Floating I-Tube

The floating I-Tube, when disconnected from the OEC unit, is designed to survive a variety of environmental conditions at its site. The design was studied for a specific location during a 1-year storm event in its floating condition (as depicted in FIG. 2). The numerical code, OrcaFlex, was used to analyze the floating I-Tube, taking into account hydrodynamic loads due to wave and current on the structure. Irregular waves with a Joint North Sea Wave Observation Project (JONSWAP) spectrum were considered, with significant wave heights that varied from 3 to 7.65 meters, with a wave period of 13.6 seconds. A summary of the results is show in FIG. 12. The horizontal offset in surge and sway, respectively "xx" and "yy", show a restrain motion without consequences for adjacent OEC units. A minimum airgap is guaranteed, thus ensuring that the I-tube is not fully submerged.

The metrics described above is not representative of an exhaustive list of characteristics that may be analyzed as other metrics may be incorporated. Additionally, the metrics may be used individually or in combination with one another. Thus, the example illustrating the use of technology disclosed herein should not be taken as limiting or preferred. The examples provided above are merely used to illustrate the technology disclosed without being overly complicated. It is not intended to illustrate all of the technologies disclose.

A person having ordinary skill in the art will appreciate that there are many potential applications for one or more implementations of this disclosure and hence, the implementations disclosed herein are not intended to limit this disclosure in any fashion.

The invention claimed is:

1. A floating connector system of an offshore energy converter device, the system comprising:
   a buoy having a tube and bay, the buoy providing buoyancy to the floating connector system;
   at least one cable; and
   a joint box configured to provide an electrical connection between the at least one cable and a switchgear of the offshore energy device,
   wherein:
   the bay has an open configuration in which an interior space is accessible and an enclosed configuration in which access to the interior space is hindered;
   the joint box is provided within the interior space,
   the electrical connection between the at least one cable and the switchgear of the offshore energy device may be completed by connecting the at least one cable and the switch gear to the joint box, and
   when the at least one cable is connected to the joint box, the tube houses sections of the at least one cable.

2. The floating connector system of claim 1, further comprising a lifting pad eye disposed at the top of the buoy, the lifting pad eye providing an attachment point to which a winch may attach in order to lift the floating connector system.

3. The floating connector system of claim 1, wherein the bay is in the enclosed configuration and contains pressurized air to control the buoyancy of the floating connector system.

4. The floating connector system of claim 1, wherein the bay is in the enclosed configuration and contains air pressurized to a level such that the floating connector system is fully submerged and floating at an intermediate equilibrium position in a water column.

5. The floating connector system of claim 1, further comprising at least one bell mouth disposed at the bottom of the tube, the bell mouth providing an attachment point for a bending stiffener.

6. The floating connector system of claim 5, wherein the bending stiffener extends from the at least one bell mouth at the bottom of the tube and provides rigidity to a section of each of the at least one cable covered by the bending stiffener.

7. The floating connector system of claim 1, wherein when the at least one cable is electrically connected to the switchgear of the offshore energy device, energy generated by the offshore energy converter device may be transmitted from the offshore energy converter device to the at least one cable.

8. The floating connector system of claim 1, wherein one of the at least one cable is a shore cable and when the shore cable is electrically connected to the switchgear of the offshore energy device, energy generated by the offshore energy converter device may be transmitted through the shore cable to shore.

9. The floating connector system of claim 1, wherein the buoy includes an extra floater to provide additional buoyancy.

10. The floating connector system of claim 1, wherein the at least one cable includes a first cable and a second cable connected to the joint box and when the switchgear is disconnected from the joint box, an electrical circuit remains between the first cable and the second cable, and the buoy may be uncoupled from the offshore energy device without breaking the electrical circuit.

11. The floating connector system of claim 1, wherein:
    the at least one cable enters the buoy from a bottom end of the tube and runs to a top end of the tube;
    the buoy is air-tight at the top end when the bay is in the enclosed configuration and the buoy is not air-tight at the top end when the bay is in the open configuration;
    the joint box is accessible from the top end only in the open configuration such that the electrical connection between the switchgear and the at least one cable may be made or disconnected only when the bay is in the open configuration; and
    when the bay is in the enclosed configuration and the buoy is disconnected and deployed from the offshore energy device, air retained at the top end of the bay provides the primary source of buoyancy to the floating connector system.

12. A method for installing a floating connector system of an offshore energy converter device, the method comprising:
    picking up a cable end of a pre-laid section of an array of cables from a seabed; and
    connecting the cable end inside the floating connector system, wherein floating the connector system includes:
    a buoy having a tube and a bay, the buoy providing buoyancy to the floating connector system; and
    a joint box configured to provide an electrical connection between the at least one cable and a switchgear of the offshore energy device,
    wherein:
    the bay has an open configuration in which an interior space is accessible and an enclosed configuration in which access to the interior space is hindered;
    the joint box is provided within the interior space,
    the electrical connection between the at least one cable and the switchgear of the offshore energy device may be completed by connecting the at least one cable and the switch gear to the joint box, and
    when the at least one cable is connected to the joint box, the tube houses sections of the at least one cable.

13. The method of claim 12, further comprising deploying the floating connector system with the at least one cable end electrically connected to the joint box inside the floating connector system.

14. The method of claim 12, wherein the floating connector system, further comprises a lifting pad eye disposed at the top of the tube, the lifting pad eye providing an attachment point to which a winch may attach in order to lift the floating connector system.

15. The method of claim 12, wherein the bay is in the enclosed configuration and contains pressurized air to control the buoyancy of the floating connector system.

16. The method of claim 12, wherein the bay is in the enclosed configuration and contains air pressurized to a level such that the floating connector system is fully submerged and floating at an intermediate equilibrium position in a water column.

17. The method of claim 12, wherein when the at least one cable is electrically connected to the switchgear of the offshore energy device, energy generated by the offshore energy converter device may be transmitted from the offshore energy converter device to the at least one cable.

18. The method of claim 12, wherein one of the at least one cable is a shore cable and when the shore cable is electrically connected to the switchgear of the offshore energy device, energy generated by the offshore energy converter device may be transmitted through the shore cable to shore.

19. The method of claim 12, wherein the floating connector system is aboard an anchor handling vessel and the at least one cable end is connected inside the floating connector system.

20. The method of claim 12 further comprising running the at least one cable from a bottom end of the tube to a top end of the tube, wherein:
- the buoy is air-tight at the top end when the bay is in the enclosed configuration and the buoy is not air-tight at the top end when the bay is in the open configuration;
- the joint box is accessible from the top end only in the open configuration;
- the electrical connection between the switchgear and the at least one cable may be completed when the bay is in the open configuration; and
- when the bay is in the enclosed configuration and the buoy is disconnected and deployed from the offshore energy device, air retained at the top end of the bay provides the primary source of buoyancy to the floating connector system.

* * * * *